O. TORSETH.
LOG CONVEYING SYSTEM.
APPLICATION FILED JAN. 26, 1914.
1,118,076.
Patented Nov. 24, 1914.
7 SHEETS—SHEET 1.
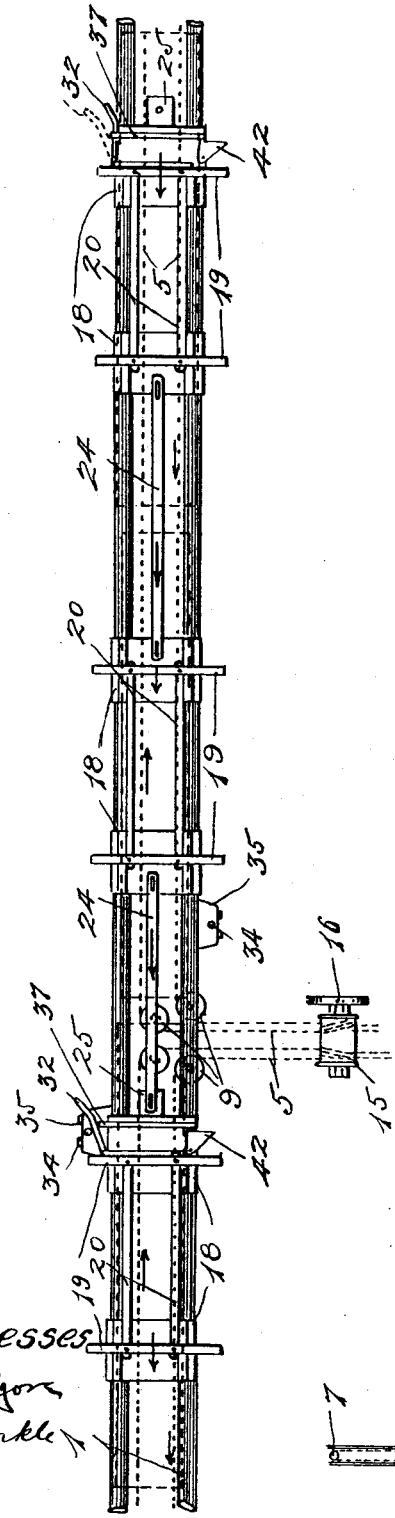
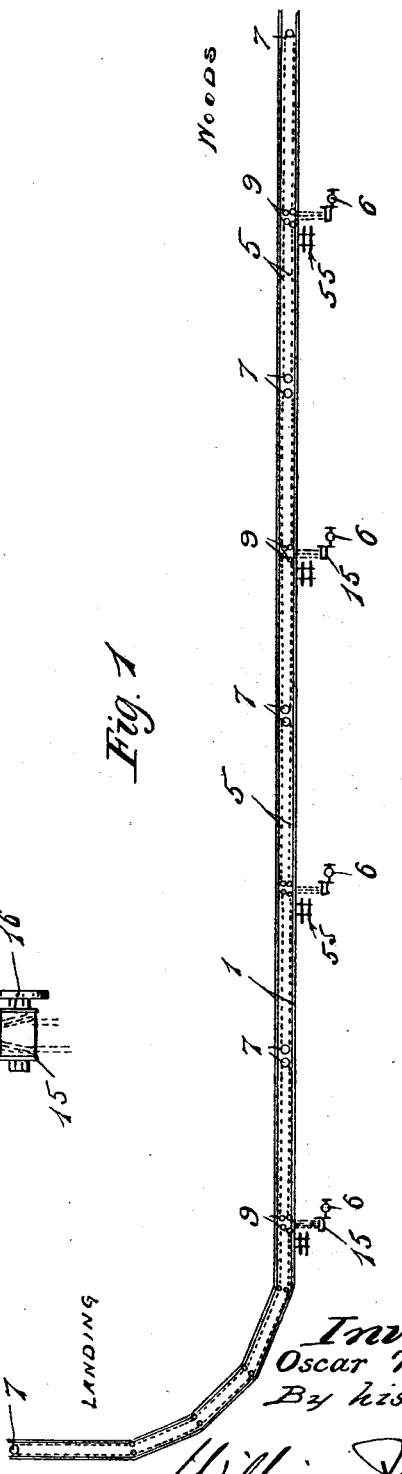
Witnesses
H. O. Kilgor
E. C. Skinkle
Inventor
Oscar Torseth
By his Attorneys

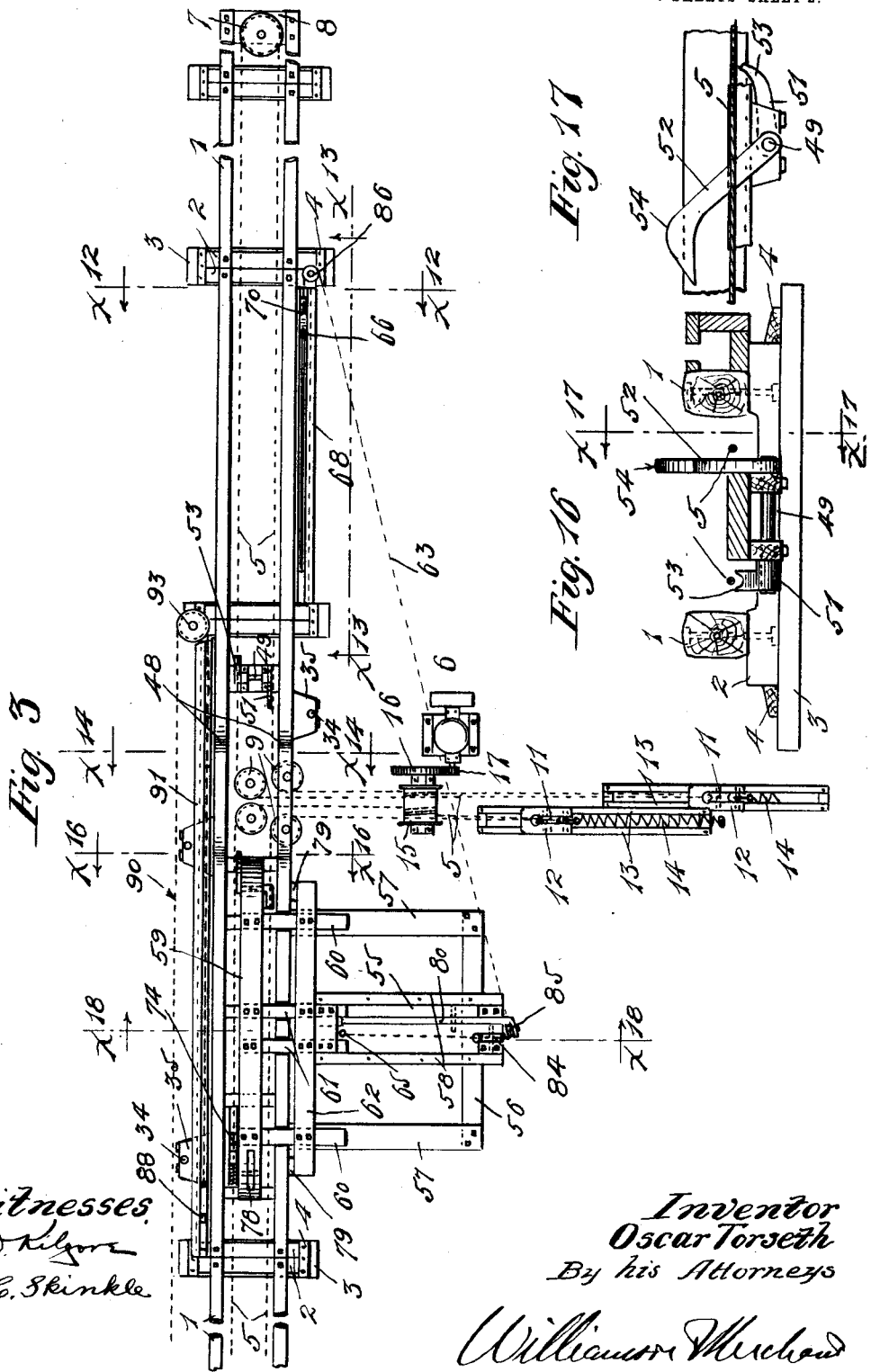

O. TORSETH.
LOG CONVEYING SYSTEM.
APPLICATION FILED JAN. 26, 1914.
1,118,076.
Patented Nov. 24, 1914.
7 SHEETS—SHEET 3.
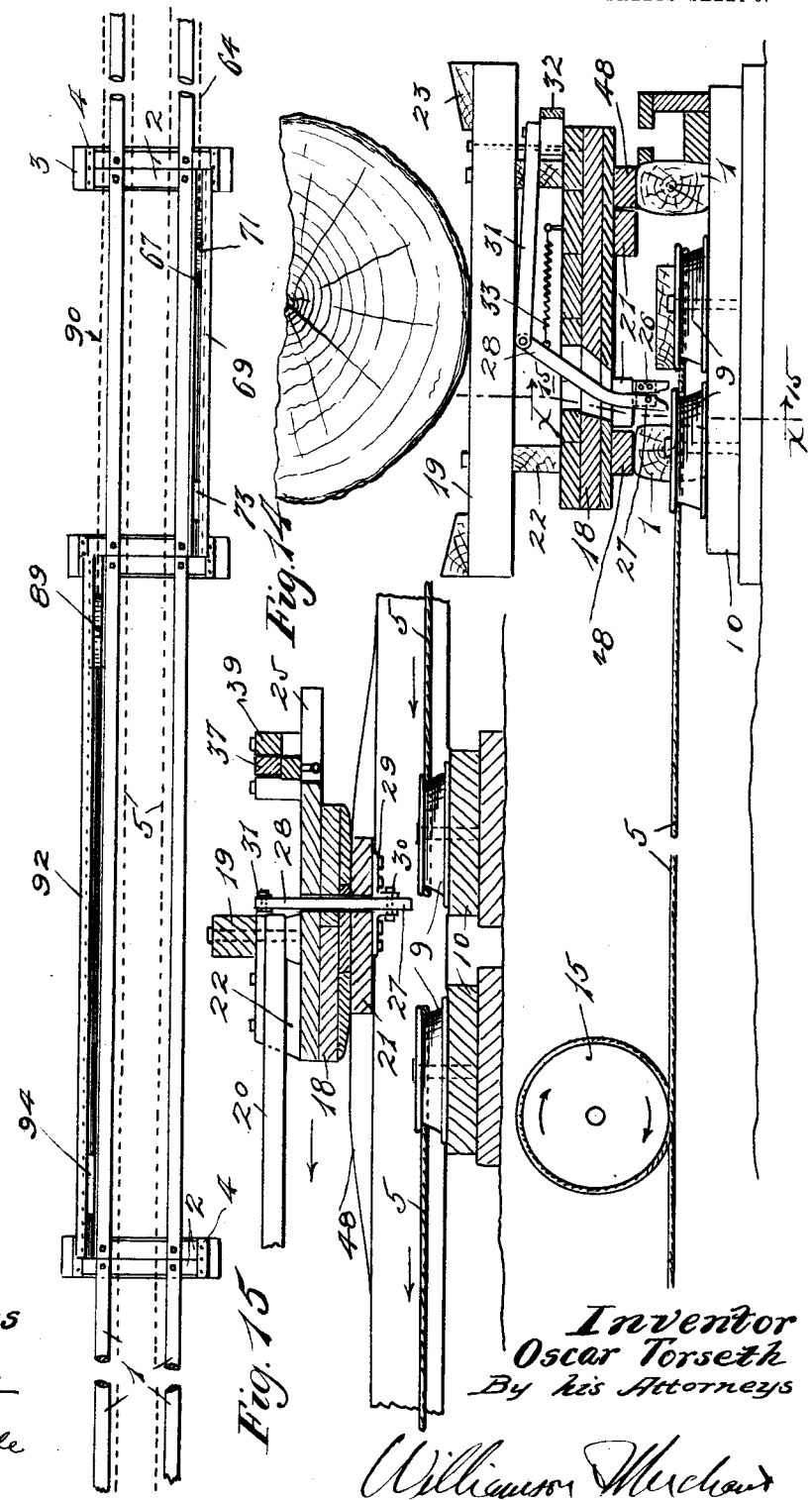
Witnesses
H. D. Kilgore
E. C. Skinkle
Inventor
Oscar Torseth
By his Attorneys
Williamson Merchant

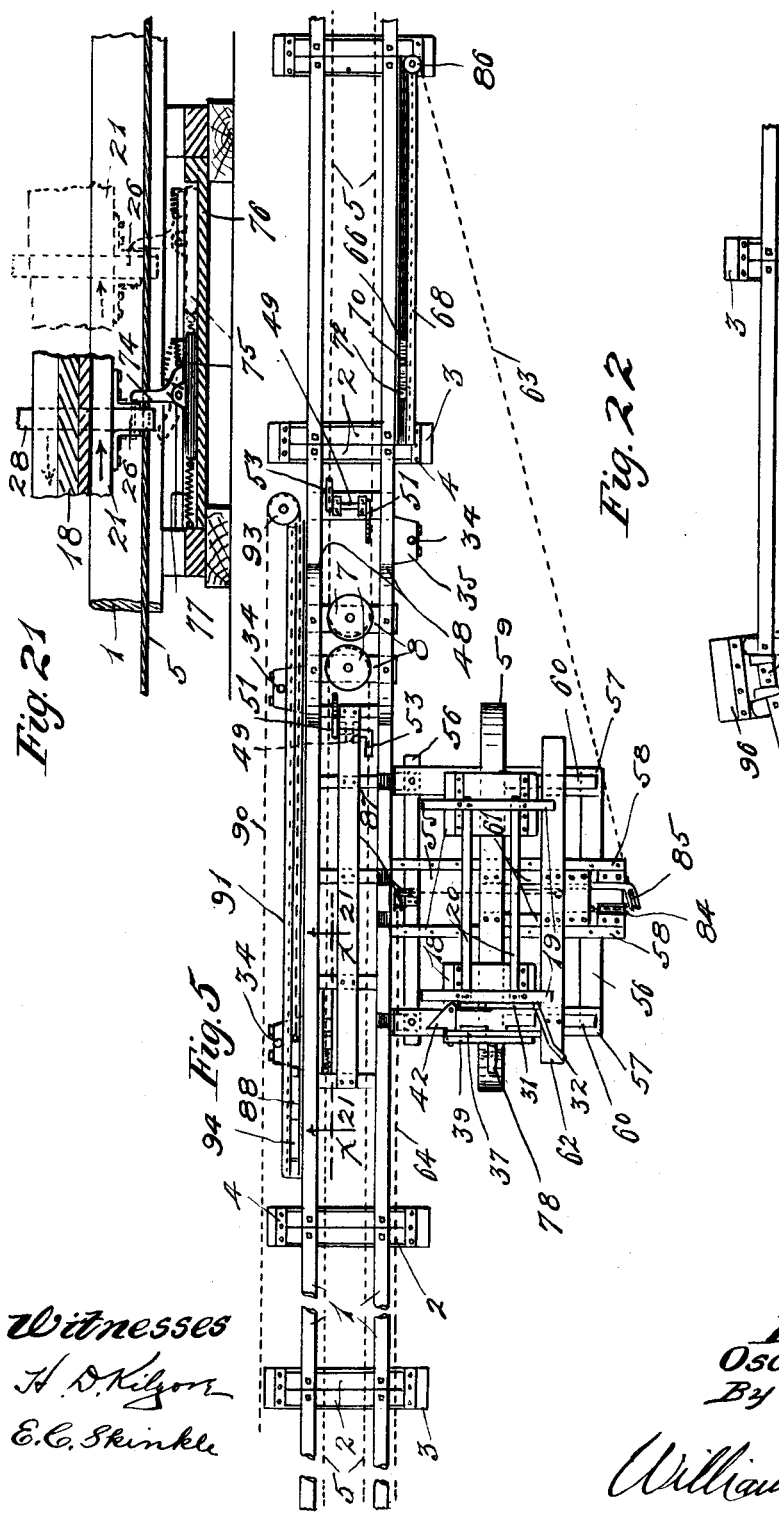

O. TORSETH.
LOG CONVEYING SYSTEM.
APPLICATION FILED JAN. 26, 1914.
1,118,076.
Patented Nov. 24, 1914.
7 SHEETS—SHEET 5.
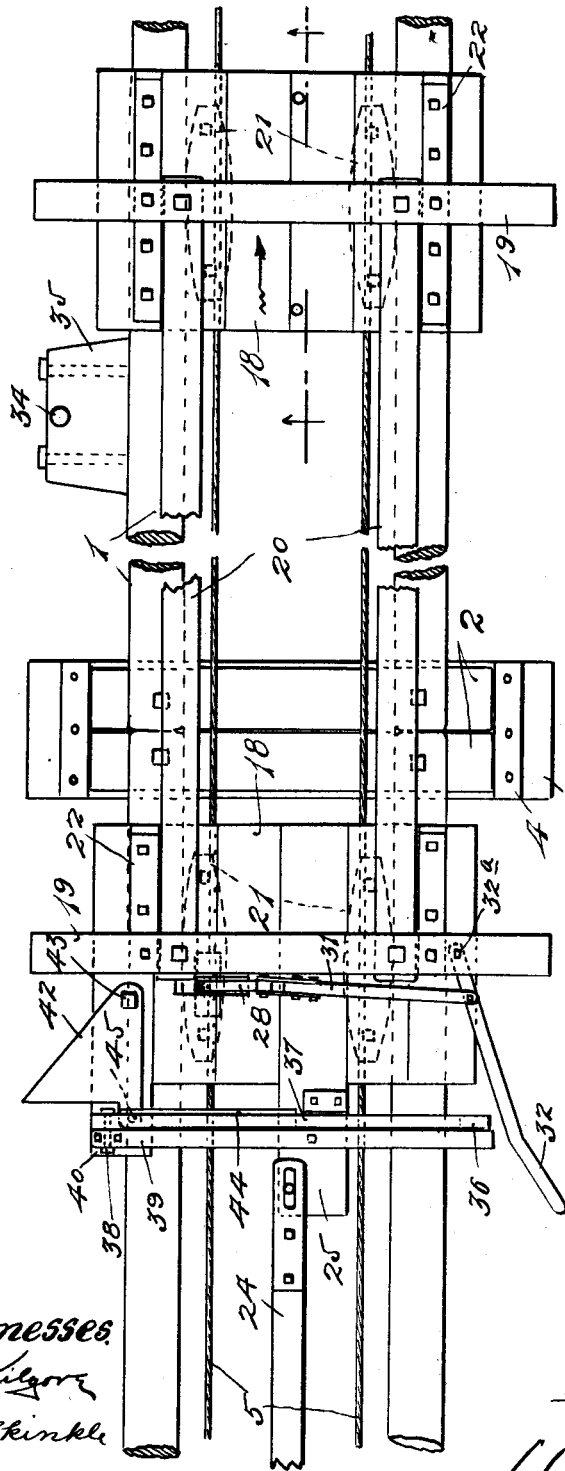
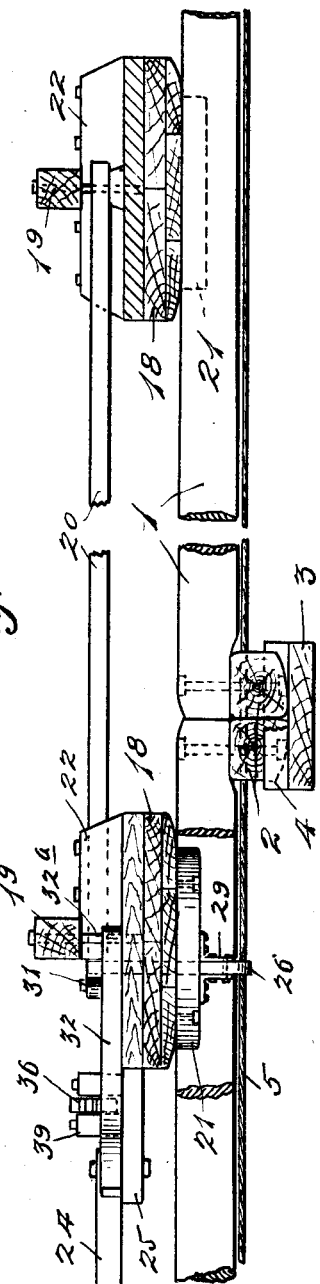
Witnesses
H. O. Kilgore
E. C. Skinkle
Inventor
Oscar Torseth
By his Attorneys
Williamson Merchant

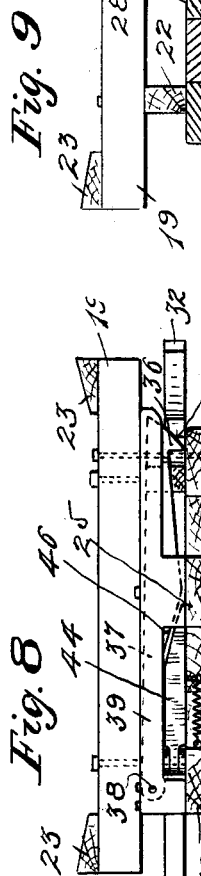

O. TORSETH.
LOG CONVEYING SYSTEM.
APPLICATION FILED JAN. 26, 1914.
1,118,076.
Patented Nov. 24, 1914.
7 SHEETS—SHEET 7.
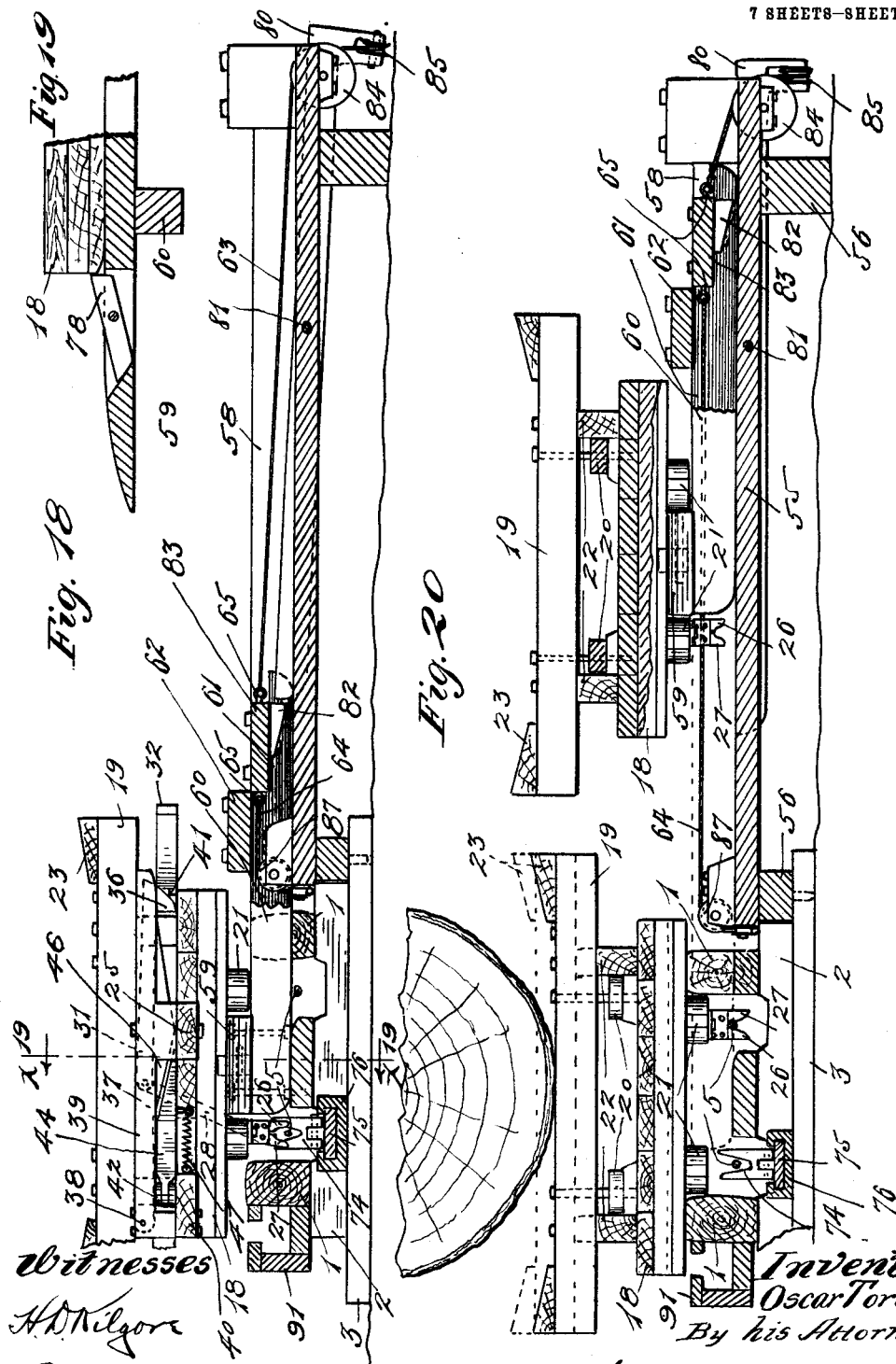
Witnesses
H. D. Kilgore
E. C. Skinkle
Inventor
Oscar Torseth
By his Attorneys

UNITED STATES PATENT OFFICE.

OSCAR TORSETH, OF EAU CLAIRE, WISCONSIN.

LOG-CONVEYING SYSTEM.

1,118,076.   Specification of Letters Patent.   Patented Nov. 24, 1914.

Application filed January 26, 1914. Serial No. 814,361.

*To all whom it may concern:*

Be it known that I, OSCAR TORSETH, a citizen of the United States, residing at Eau Claire, in the county of Eau Claire and State of Wisconsin, have invented certain new and useful Improvements in Log-Conveying Systems; and I do hereby declare the following to be a full, clear, and exact description of the invention, such as will enable others skilled in the art to which it appertains to make and use the same.

My invention has for its object to provide an improved log conveying system, especially adapted for use in conveying logs, from the woods where the trees are felled, to a landing, either at a railroad or a body of water on which the logs are to be floated.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—Figure 1 is a diagrammatic view of the improved system; Fig. 2 is a plan view of a train made up of several of the log cars, on a section of the track; Fig. 3 is a plan view of the woods or receiving end of the system; Fig. 4 is a plan view of an intermediate section of the system; Fig. 5 is a plan view of the landing or delivery end of the system; Fig. 6 is a plan view of one of the log cars and a section of the main track, some parts being broken away, and some parts being indicated by means of dotted lines; Fig. 7 is a side elevation of the parts shown in Fig. 6; Fig. 8 is an end elevation of one of the log cars and one of the track sections; Fig. 9 is a view corresponding to Fig. 8, with the exception that some parts are shown in transverse vertical section, and some in different positions; Fig. 10 is a detail view in side elevation of one of the cable grips; Fig. 11 is an edge elevation of the parts shown in Fig. 10; Fig. 12 is a view partly in end elevation and partly in transverse vertical section, taken on the line $x^{12}$ $x^{12}$ of Fig. 3, some parts being shown by means of dotted lines; Fig. 13 is a view partly in side elevation and partly in longitudinal vertical section, taken in the vicinity of the line $x^{13}$ $x^{13}$ of Fig. 3; Fig. 14 is a view partly in end elevation and partly in transverse vertical section, taken on the line $x^{14}$ $x^{14}$ of Fig. 3, and also showing one of the log cars; Fig. 15 is a longitudinal vertical section, taken on the line $x^{15}$ $x^{15}$ of Fig. 14; Fig. 16 is a view partly in end elevation and partly in transverse vertical section, taken on the line $x^{16}$ $x^{16}$ of Fig. 3; Fig. 17 is a detail view, in side elevation, in the vicinity of the line $x^{17}$ $x^{17}$ of Fig. 16; Fig. 18 is a vertical section, taken on the line $x^{18}$ $x^{18}$ of Fig. 3, and showing an empty car on the track in a position to be transferred to one of the siding platforms; Fig. 19 is a detail view, principally in longitudinal vertical section, taken on the line $x^{19}$ $x^{19}$ of Fig. 18; Fig. 20 is a view corresponding to Fig. 18, with the exception that the empty car has been transferred to the siding platform and a loaded car is passing the same; Fig. 21 is a longitudinal vertical section, taken on the line $x^{21}$ $x^{21}$ of Fig. 5; and Fig. 22 is a plan view of the track sections, at a curve or angle.

The main line is made up of a plurality of independent track sections placed end to end. The ends of the rails or skids 1 of the track sections rest upon, and are bolted to, ties 2 which are cut out or notched, at their intermediate portions, the purpose of which will presently appear. The two ties, at the abutting ends of the rails 1, loosely rest upon a single sleeper 3, and are secured against endwise movement thereon by transverse cleats 4, spiked to said sleeper. Each rail 1 is hewn from a single log, and the abutting ends thereof are rounded on their upper surfaces, as best shown in Figs. 7 and 13. It will also be noted, by reference to these same figures, that the bottoms of the ties 2 are curved upwardly toward the intermediate portions of the rails 1. By thus reversely rounding the upper ends of the rails 1 and the bottoms of the ties 2, the log cars, in passing over the rail joints, will not strike the ends of the rails; and where said rails are laid on uneven ground, the ties 2 will rock on the sleepers 3, without lifting the abutting ends of rail sections one above the other.

A plurality of endless log car-pulling cables 5 extend the full length of the main line, and travel between the rails 1, within the cut-out portions of the ties 2. The entire system is divided into blocks, and there are two pulling cables for each block. As shown, I preferably employ a single explosive engine, indicated as an entirety by the numeral 6, for driving the two cables of each block. It is, of course, understood that any other suitable means may be employed for driving the cables 5. The outer ends of each pair of cables 5 extend in opposite directions down the main line, say, one-eighth of a mile each way, and run over guide sheaves 7 secured to transverse timbers 8 bolted to the under side of the rails 1. At their abutting or inner end portions, the cables 5 run over pairs of guide sheaves 9 bolted to timbers 10 between the rails 1, as best shown in Figs. 14 and 15. From the guide sheaves 9, the cables 5 extend at right angles and to one side of the main line, past the engines 6, and run over guide sheaves 11, as best shown in Fig. 3. Each of the guide sheaves 11 is journaled on a sliding block 12, which, in turn, is mounted on a pair of rails 13 that extend at right angles to the rails 1. These sliding blocks 12 are provided for taking up the slack in the cables 5, and, as best shown in Fig. 3, are yieldingly drawn away from the rails 1 by coiled springs 14 anchored to the blocks 12 and to stakes driven into the ground. In place of the springs 14, weights may be used, in which case one end of a cable will be attached to each block 12, passed over a guide sheave secured to an adjacent tree or post, and having secured to its free end a weight. The pulling section of each pair of pulling cables 5 are given several wraps around a drum 15 located between the main line and the slack take-up devices. The slack sections of the cables 5 are passed under the drums 15. As shown in Fig. 3, the drum 15 is driven by the engine 6, and is provided with a large spur gear 16 which meshes with a spur pinion 17 on the engine shaft.

In Fig. 2 is shown a train made up of three log cars, each of the end cars being equipped with cable-gripping devices. Each log car, as shown, comprises a pair of shoes 18, bolsters 19, and a pair of reach rods 20. The shoes 18 are spaced, one ahead of the other, by the reach rods 20, and rest directly on both of the rails 1. Each shoe 18 is made up of a plurality of crossed planks spiked together, and their longitudinal front and rear edges are rounded, in order that shoes may more easily slide over the rails 1. Flange blocks 21 are bolted on the bottoms of the shoes 18, between the rails 1, and thereby prevent endwise sliding movement of the shoes 18 on the rails 1. The bolsters 19 are bolted to the shoes 18, and are vertically supported thereabove by spacing blocks 22. Beveled stop blocks 23 are spiked to the outer ends of the bolsters 19, to prevent the log or logs on the cars from rolling off. In place of these blocks 23, stakes may be used, or the intermediate portions of the bolsters 19 may be hollowed out. The ends of the reach rods are extended between the shoes 18 and the bolsters 19, and are secured thereto by vertically extended bolts anchored in said shoes and bolsters. The connections between the shoes and reach rods are sufficiently loose to permit independent vertical and horizontal movements of one shoe in respect to the other. The cars are connected, one with the other, by long draw bars 24. Each rear shoe 18 is provided with a rearwardly projecting extension 25, to which the draw bars 24 are connected.

The cable-grip mechanism for each grip car comprises a relatively fixed jaw 26 and a relatively movable jaw 27 having a lever extension 28, as best shown in Figs. 10 and 11. The jaw 26 is rigidly bolted to a bracket 29, which, in turn, is bolted to one of the flange blocks 21 of the rear shoe 18, and the jaw 27 is pivoted, at 30, to said bracket, for movement toward and from said fixed jaw. A link 31 connects the upper or free end of the lever extension 28, which works through a slot in the rear shoe 18, to the intermediate portion of a horizontally extended grip lever 32 having its short end pivoted, at 32ᵃ, between the rear shoe 18 and its bolster. The movable grip jaw 27 is normally and yieldingly held away from the fixed jaw 26 by a coiled spring 33 anchored to the lever extension 28 and the rear shoe 18, as best shown in Figs. 9 and 14. The grip lever 32 extends rearwardly from the right-hand side of the log car, and is normally and yieldingly held outward, as best shown in Fig. 6, by the spring 33.

At certain pre-determined intervals along the main line are located, on each side thereof, a plurality of vertically projecting pins 34, the lower ends of which are anchored in blocks 35 bolted to the outer faces of the rails 1. These pins 34, the exact location of which will presently be described, serve a double purpose in setting and releasing the cable-grip mechanism. When the grip jaws 26—27 are open, and the grip car passes one of the pins 34 on the side of the track on which the grip lever 32 is located, said lever is pressed inward thereby. This movement of the lever 32, through its several connections to the jaw 27, moves said jaw toward the coöperating jaw 26, thereby clamping the cable 5 therebetween. Before the grip lever 32 passes entirely out of contact with the engaged pin 34, the same its several connections to the jaw 27, moves hook 36 on the free end of a long lever 37 pivoted, at 38, to a horizontally extended bar 39. This bar 39 extends transversely of the log car, parallel with the lever 37, and is rigidly bolted to the rear shoe extension 24 and to a second extension 40 on said shoe. As the grip lever 32 is moved inward, by the engaged pin 34, the same first engages a cam nose 41 on the hook 36, and thereby lifts the lever 37 a distance sufficient to permit said grip lever to pass under the hook 36. After the grip lever 32 passes under the hook 36, said hook drops, under the action of gravity, engages the grip lever 32, and holds the same against return movement. By reference to Fig. 8, it will be noted that, when the lever 32 is held by the lever 37, the free end of the lever 32 extends under the adjacent end of the bar 39, and is held thereby against lifting movement.

For releasing the grip from the cable 5, a cam trip block 42 is pivoted, at 43, to the opposite side of the rear shoe 18 from the grip lever 32. The cam surface of this tripping block 42 normally extends rearwardly and outwardly from the log car. One end of a sliding wedge block 44 is pivoted, at 45, to the rear inner edge portion of the cam block 42. This wedge block 44 works under the lever 37, and rests directly on the rear shoe extensions 24 and 40, as best shown in Figs. 6, 8 and 18. Formed on the under side of the lever 37 is a cam surface 46, with which the wedge block 44 coöperates to lift the hook 36 out of engagement with the grip lever 32. A coiled spring 47, anchored to the rear shoe extension 40 and to the wedge block 44, normally holds said wedge block retracted and the cam block 42 in a position to be engaged by one of the pins 34. When the cam block 42 engages one of the pins 34, the same is swung inward on its pivot 43, thereby forcing the wedge block 44 under the cam surface 45 on the lever 37, thereby lifting the hook 39 out of engagement with the grip lever 32, and releasing the same. At the time the trip lever 32 is released, the spring 33 moves the pivoted jaw 27 away from the fixed jaw 26, thereby releasing the cable 5. As one of the grip cars is passing over either of the sheaves 7 or 9, or, in other words, from one cable section to another, the movable jaw 27 of its grip mechanism is first automatically opened, to release the held cable section, and then automatically closed on the adjacent cable section, as previously described. In each train of log cars, it is necessary to have two grip cars, in order that the rear grip car may push the front car from one cable section to the other, at the time its grip mechanism is released from said cables, and for the front car to pull the rear car from one cable section to the other.

At the time the log cars are passing over either of the guide sheaves 7 or 9, it is necessary to elevate the car a distance sufficient to permit the grip jaws 26—27 to pass over said sheaves. This elevating of the cars is accomplished by rigidly securing heavy planks 48 on the upper surfaces of the rails 1, adjacent to the sheaves 7—9, as best shown in Figs. 3, 5, 14 and 15. The ends of these planks 48 are beveled to sharp edges, where they leave the rails 1, in order to permit the shoes 18 to smoothly pass thereover.

To grip one of the cable sections 5 with the jaws 26—27, after one of the grip cars has passed over either of the sheaves 7 or 9, it is necessary to raise the underlying section of said cable, so as to come between said jaws. To accomplish this result, I place transversely of the track, between the rails 1, a plurality of rock shafts 49 journaled in bearings 50. On one end of each rock shaft 49 is secured an arm 51, and on the other end thereof is secured an arm 52. These arms 51—52 extend upwardly and outwardly in opposite directions, and they are provided, at their free ends, respectively, with a fork 53 and a cam head 54. As best shown in Figs. 3 and 5, there is one of these cable-lifting devices on each side of the sheaves 7—9, and the arms 51—52 are alternately secured to the rock shafts 49, so as to lift the cables in either direction of travel of the log cars. The shoes 18 of the log cars, in passing over the cam heads 54, depress the same, thereby rocking the shafts 49 and elevating the forks 53. These forks 53 directly underlie the cable 5, and, when raised, lift the underlying sections of said cables into positions where they may be engaged by the grip jaws 26—27.

From the above description, it is evident that the loaded cars, in traveling from the woods to the landing, will be successively moved from one cable section to another, and automatically trasferred over the intervening spaces between adjacent cable sections. To return the empty cars of a train from the landing to the woods, the several empty cars are placed upon one of the grip cars. Before this is done, however, the grip car, which is to carry back the empties, must be picked up manually and turned end for end, in order that its grip jaws 26—27 may engage the return portions of the cable sections 5. To start the cars back on their return trip, the lever 32 is set by hand.

There can be one loaded train and one empty train in each block of the system. To permit the loaded cars to pass the empty cars on the single track, it is necessary to side-track the empty cars once in each block. The side-tracking of the empty cars, and the returning of the same to the main line, is accomplished by a novel method, actuated by an approaching and a receding loaded car. Upon approaching one of the engine stations, the loaded cars automatically transfer the empty cars to one side of the main track, and then, after having passed the same, automatically return the empty cars to the main track and start the same on their return travel to the woods.

Located adjacent to each engine 6, and toward the landing end of the system therefrom, is a car-off-setting station or platform 55. Each of these platforms 55 rests on heavy timbers 56, having bolted to their ends, outward of the platform, a pair of heavy rails or skids 57 which extend at right angles to the rails 1. Intermediate rails 58 are extended parallel with the rails 51, and are spiked, one to each of the outer longitudinal edges of the platform 55.

To remove the empty cars to the siding platform, and then return the same to the main track, I provide a long, narrow, movable deck 59, which extends parallel with the rails 1. This deck is mounted on a pair of relatively heavy runners 60, arranged to travel on the rails 57, and a pair of relatively light runners 61, arranged to travel on the platform 55 between the rails 58. These rails 58, with which the runners 61 engage, prevent endwise movement of the deck 59. As best shown in Fig. 3, the rail 1, adjacent to the platform 55 is transversely notched or cut away, to permit the runners 60—61 to work therethrough. One end of each runner 60—61 is bolted to the deck 59 which rests thereon, and the other ends of the said runners are connected by a tie plank 62 which extends parallel to the deck 59. When the deck 59 is in a position to receive one of the empty cars from the main line, the same extends intermediately between the rails 1 and a distance thereabove sufficient to carry the flange blocks 21 above the upper surfaces of the said rails. Both ends of the deck 59 are beveled, and its extreme outer ends extend slightly below the top of the rails, in order to receive the shoes 18 of the log cars and elevate the same as they travel onto said desk. When a log car is resting on the deck 59, the same is free to be moved laterally over the rails 1 to the siding platform 55.

To move the deck 59 from the siding platform to a position between the rails 1, for receiving an empty car, and then return the deck to said platform, I provide a pair of reversely extended cables 63—64, as best shown in Figs. 3, 4 and 5. The inner ends of the two cables 63—64 are secured, at 65, to the runners 61, and their outer ends are attached to a pair of cross-heads 66 and 67, respectively. These cross-heads 66—67 are slidably mounted in guideways 68 and 69, respectively, secured to the rail 1 and ends of the ties 2 adjacent to the siding platform 55, as best shown in Figs. 12 and 13. By reference to Figs. 4 and 5, it will be noted that the guideways 68—69 are located one on each side of the platform 55.

In each cross-head 66—67 is formed a vertically extended mortise, in which is mounted spring-held knees 70 and 71, respectively. The knees 70—71 are arranged to fold, to permit a log car, traveling from the landing to the woods, to pass thereover, but they will not fold in an opposite direction. When the deck 59 is on the main track, to receive an empty car, the knees 70—71 are in the ends of the guideways 68—69 nearest the woods. A loaded car from the woods, traveling in the direction of the arrow marked on Fig. 13, will engage the knee 70 with its front shoe and slide the same over the bottom of the guideway 68, until said knee reaches the opposite end of said guideway. At this end of the guideway, there is a slot 72, so arranged as to permit the knee 70 to rotate on its pivotal support, so as to permit the shoes 18 to pass thereover, as shown by dotted lines in Fig. 13. This movement of the knee 70 along the guideway 68 has moved the deck 59, by the cable connection 63, from a position on the main line to a position at one side thereof on the siding platform. At the same time, the cable connection 64 has moved the knee 71 in an opposite direction from which the knee 70 has been moving. The loaded car, after passing the siding platform 55, engages the knee 71 and moves the same to the opposite end of the guideway 69, wherein is formed a slot 73. This slot 73 is so arranged as to permit the knee 71 to rotate on its povital support, in order that the shoes 18 may pass thereover. During this movement of the knee 71, the deck 59, through the cable connection 64, has again been reset onto the main track, and the knee 70 returned to its original position. In place of using springs for holding the knees 70—71 in upright positions, the lower ends of said knees may be weighted, so as to accomplish the same result.

To stop the empty cars at a predetermined position on the deck 59, a stop 74, of substantially the same construction as the knees 70—71, is mounted on a cross-head 75. Just before an empty car engages the stop 74, its cable-grip is released by the engagement of the trip block 42 with one of the pins 34. The cross-head 75 is slidably mounted in a guideway 76 placed between the rails 1, directly under the cable sctions 5 which return the empty cars, and with the stop 74 in a position to be engaged by the grip jaws 26—27. A relatively strong coiled spring 77 connects the cross-head 75 to the guideway 76, and is so arranged as to permit the stop 74 to move a limited distance after being engaged by the jaws 26—27. When an empty car is moved from the main track to a siding platform, the jaws 26—27 are moved laterally out of engagement with the stop 74. Said stop is then returned to its normal position by the spring 77, and, when the empty car is returned to the main track, the stop 74 will be back of the jaws 26—27, thus permitting free forward movement of the car. While the stop 74 limits the forward movement of an empty car on the deck 59, a gravity-actuated lock dog 78 prevents backward movement of the car on said deck (see Fig. 19). This lock dog 78 is pivotally mounted on the deck 59, and is so located as to engage the rear shoe 18 of the car, after said shoe has passed thereover. The deck 59 is positively locked in an operative position, between the rails 1, by a pair of stops 79 on the end portions of the tie plank 62, which engage the adjacent rail 1, and a lever 80 pivoted, at 81, to the siding platform 55. The lever 80 extends parallel with the rails 58, and its outer end is so weighted as to normally hold its inner end raised and in a position to be engaged by a stop 82 on a plank 83 bolted to the rails 58 (see Fig. 18).

The cable 63 at the siding platform runs under a guide sheave 84, journaled to said platform, and a guide sheave 85, journaled on the weighted end of the lever 80. At the end of the guideway 68 farthest from the deck 59, the cable 63 runs over a guide sheave 86 journaled on said guideway. When a pulling strain is placed on the cable 63, to move the deck 59 from the track to the siding platform, said strain will lift the weighted end of the lever 80, and thereby move its other end out of engagement with the stop 82. The cable 64 runs over a pair of guide sheaves 87, journaled on the timber 56 adjacent to the track 1.

The loaded cars, in addition to moving the empty cars to and from the siding platform, also move said empty cars, after the same have been returned to the main track, from the deck 59 into a position where their grips 26—27 may engage the cable 5. This initial forward movement of an empty car, by a loaded car, is accomplished by a pair of reversely movable knees 88—89, connected by a cable 90. These knees 88—89 are mounted on cross-heads, not shown, slidably mounted in guideways 91 and 92, respectively. Said knees and their cross-heads are identical with the knees 70—71 and their cross-heads. The guideways 91—92 are located on the opposite side of the track from the transfer station, and the guideway 91 is located directly opposite said station, and the guideway 92 is longitudinally spaced therefrom toward the landing. The cable 90 runs over a guide sheave 93, journaled on one of the sleepers 3 adjacent to the end of the guideway 91 nearest the woods. Both knees 88—89 are arranged to fold, to permit the shoes of a car to pass thereover, when traveling toward the landing; but they will not fold when engaged by the shoes of a car traveling in the other direction. Normally, the knees 89—89 are at the inner ends of their guideways. A car, traveling from the woods to the landing, will pass over the knee 88, and before the knee 89 is engaged thereby, the empty car will have been returned to the main line, in a manner previously described. The knee 88 is so located as to normally stand directly behind the rear shoe of an empty car on the deck 59; and when the knee 89 is engaged by the loaded car, and moved therewith, the knee 88 is moved into engagement with the rear shoe of the empty car, and thereby moves said empty car from the deck 59. During this movement of the empty car by the knee 88, its grip lever 32 has passed the stop pin 34 directly opposite the engine 6 (see Fig. 3), thereby setting the grip jaws of the empty car on the underlying cable. At the limit of the travel of the knees 88—89 toward the outer ends of their guideways, the same are tripped out of action by slots 94, cut in the bottoms of said guideways, in a manner similar to the tripping of the knees 70—71. The knees 88—89 are re-set in their normal position by the next loaded car engaging the knee 88.

By reference to Fig. 21, it will be noted that the stop 74 will yield, to permit the flange blocks 21 of loaded cars to pass thereover.

The cable 5, at an angle in the track (see Fig. 22), runs over a pair of guide sheaves 95, journaled on a wide sleeper 96. The abutting ends of the rail sections, resting on the sleeper 96, are spaced apart, and short rail sections 97 interposed therebetween. These short rail sections are set slightly out of line with the rails 1; and when the flange blocks 21 of a car engage the shortest of said rail sections, the car is moved laterally on the rails 1 a distance sufficient to permit its grip jaws 26—27 to pass the guide sheave 95, adjacent to the shortest of said rail sections.

The above described device has, in actual usage, proven highly satisfactory for the purpose had in view.

What I claim is:—

1. The combination with a track, of a car off-setting device, arranged to move a car bodily to one side of the track to permit an approaching car to pass the same, and means controlled by an approaching car, for operating said off-setting device.

2. The combination with a track, of a car off-setting device, arranged to move a car bodily to one side of the track to permit an approaching car to pass the car on said off-setting device, and after having passed the same to again return the car on said off-setting device to the track, and means controlled by an approaching and a receding car for operating said off-setting device.

3. The combination with a track, of a car off-setting device, means, controlled by an approaching and a receding car, for operating the same, and means, controlled by said receding car, for imparting the initial starting movement to a car on said off-setting device.

4. The combination with a track, of a movable car off-setting deck, arranged to lift a car from said track when passing over the same, and means, controlled by an approaching and receding car, for moving said deck laterally to and from said track.

5. The combination with a track, of a movable car off-setting deck, arranged to lift a car from said track when passing over the same, means, controlled by an approaching and receding car, for moving said deck laterally to and from said track, and means, controlled by said receding car, for imparting the initial starting movement to a car on said deck.

6. The combination with a track, a power-driven cable extending along said track, and cars arranged to run on said track and having cable grips, of a movable car off-setting deck on said track, a trip for releasing the cable grip of a car on passing onto said deck, and means, including a pair of reversely extended cables, actuated by a car approaching said deck, for moving the same to one side of said track and for moving said deck back onto the track after having passed the same.

7. The combination with a track, a power-driven cable extending along said track, and cars arranged to run on said track and having cable grips, of a movable car off-setting deck on said track, a trip for releasing the cable grip of a car on passing onto said deck, means, including a pair of reversely extended cables, actuated by a car approaching said deck, for moving the same to one side of said track and for moving said deck back onto the track after having passed the same, and means, actuated by the receding car, for imparting the initial movement to the off-set car on said deck.

8. The combination with a track, a power-driven cable extending along said track, and cars arranged to run on said track and having cable grips, of a movable car off-setting deck on said track, a trip for releasing the cable grip of a car on passing onto said deck, means, including a pair of reversely extended cables, actuated by a car approaching said deck, for moving the same to one side of said track and for moving said deck back onto the track after having passed the same, means, actuated by the receding car, for imparting the initial movement to the off-set car on said deck, and means rendering the cable grip of said off-set car operative while the same is being moved by said receding car.

9. The combination with a track, a power-driven cable extending along said track, and cars arranged to run on said track and having cable grips, of a movable car off-setting deck on said track, arranged to lift a car from the track when passing over the same, a trip for releasing the cable grip of a car on passing over said deck, means, actuated by a car approaching said deck, for moving the same to one side of said track and for moving the said deck back onto the track after having passed the same, means, actuated by the receding car, for imparting the initial movement of the off-set car on said deck, and means rendering the cable grip of said off-set car operative while the same is being moved by said receding car.

10. The combination with a track, of a movable car off-setting deck on said track, means for moving said deck to and from said track, and a stop for limiting the forward movement of a car on said deck, said stop being rendered inoperative by the movement of said deck from said track.

11. The combination with a track, of a movable car off-setting deck on said track, means for moving said deck to and from said track, a stop for limiting the forward movement of a car on said deck, said stop being rendered inoperative by the movement of said deck from said track, and a stop on said deck to prevent backward movement of a car on said deck.

12. The combination with a track, of a movable car off-setting deck on said track, means for moving said deck to and from said track, a stop for limiting the forward movement of a car on said deck, said stop being rendered inoperative by the movement of said deck from said track, and a movable stop on said deck, rendered inoperative by a car passing over the same, but operative to prevent backward movement of the said car on said deck.

13. The combination with a track, of a movable car off-setting deck on said track, means, including a pair of reversely extended cables, for moving said deck to and from said track, and a lock for securing said deck in position on said track, said lock being arranged to be actuated by the pulling strain on the cable which moves said deck from said track.

14. The combination with a track, of a movable car off-setting deck on said track, means, including a pair of reversely extended cables, for moving said deck to and from said track, reversely acting stops for positioning said deck on said track, one of said stops being movable and arranged to be rendered inoperative by the pulling strain on one of said cables.

15. The combination with a track, of a car off-setting device, arranged to move a car bodily to one side of a track, and means, actuated by a moving car on said track, to first render said car off-setting device inoperative and then operative.

16. The combination with a track, a power-driven cable extending along said track, and cars arranged to run on said track and having cable grips, of a car off-setting device, automatic means for rendering the cable grip of an off-set car inoperative, and means, actuated by a car on said track, for rendering the cable grip of an off-set car operative.

In testimony whereof I affix my signature in presence of two witnesses.

OSCAR TORSETH.

Witnesses:
ALICE L. KING,
HARRY D. KILGORE.

Copies of this patent may be obtained for five cents each, by addressing the "Commissioner of Patents, Washington, D. C."